(12) United States Patent
Tan

(10) Patent No.: US 8,331,552 B2
(45) Date of Patent: Dec. 11, 2012

(54) DETECTION OF DOUBLE TALK IN TELECOMMUNICATIONS NETWORKS

(75) Inventor: Mizhou Tan, Easton, PA (US)

(73) Assignee: Agere Systems LLC, Wilmington, DE (US)

( * ) Notice: Subject to any disclaimer, the term of this patent is extended or adjusted under 35 U.S.C. 154(b) by 1251 days.

(21) Appl. No.: 12/117,901

(22) Filed: May 9, 2008

(65) Prior Publication Data

US 2009/0279685 A1 Nov. 12, 2009

(51) Int. Cl.
H04M 9/08 (2006.01)

(52) U.S. Cl. .............................. 379/406.04; 379/406.08

(58) Field of Classification Search ............ 379/406.01–406.16; 370/282–286; 381/66, 93, 94.1, 381/94.3; 455/570
See application file for complete search history.

(56) References Cited

U.S. PATENT DOCUMENTS

| | | | | |
|---|---|---|---|---|
| 4,918,727 | A * | 4/1990 | Rohrs et al. | 379/406.08 |
| 5,809,463 | A * | 9/1998 | Gupta et al. | 704/233 |
| 6,226,380 | B1 * | 5/2001 | Ding | 379/413.01 |
| 6,766,019 | B1 * | 7/2004 | Benesty et al. | 379/406.01 |
| 7,050,576 | B2 * | 5/2006 | Zhang et al. | 379/406.07 |
| 2002/0064139 | A1 * | 5/2002 | Bist et al. | 370/289 |
| 2004/0037419 | A1 * | 2/2004 | Zhang et al. | 379/406.07 |
| 2008/0255829 | A1 * | 10/2008 | Cheng | 704/201 |

OTHER PUBLICATIONS

"A Novel Adaption Scheme in the NLMS Algorithm for Echo Cancellation" by Jianfeng Liu, IEEE Signal Processing Letters, vol. 8, No. 1, Jan. 2001, pp. 20-22.
"A New Class of Doubletalk Detectors Based on Cross-Correlation" by Jacob Benesty et al., IEEE Transactions on Speech and Audio Processing, vol. 8, No. 2, Mar. 2000, pp. 168-172.
"A Twelve-Channel Digital Echo Canceler" by Donald L. Duttweiler, IEEE Transactions on Communications, vol. Com-26, No. 5, May 1978, pp. 647-653.

* cited by examiner

Primary Examiner — Md S Elahee
Assistant Examiner — Akelaw Teshale
(74) Attorney, Agent, or Firm — Mendelsohn, Drucker, & Associates, P.C.; Craig M. Brown; Steve Mendelsohn

(57) ABSTRACT

In one embodiment, the presence of double talk (DT) is detected in a telecommunications network having a near-end user and a far-end user. The energies of both (1) a signal received from the far-end user by the near-end user and (2) a signal to be communicated from the near-end user to the far-end user are computed. An echo return loss (ERL) estimate is calculated based on the energy calculations, and a preliminary decision is made as to whether DT is present based on the ERL estimate and the energy calculations. If DT is detected, then a counter is set to a hangover value. If DT is not detected, then the counter is reduced. This process is repeated, and, for each iteration, a final decision as to whether DT is present is made based on the counter value.

8 Claims, 5 Drawing Sheets

DETECTION OF DOUBLE TALK IN TELECOMMUNICATIONS NETWORKS

BACKGROUND OF THE INVENTION

1. Field of the Invention

The present invention relates to telecommunications networks, and, in particular, to the detection of double talk in such networks.

2. Description of the Related Art

FIG. 1 shows a simplified block diagram of a near end 100 of a prior-art telecommunications network. In particular, FIG. 1 shows near end 100 for a first user who communicates with a second user located at a far end (not shown) of the network. As depicted in FIG. 1, near end 100 has two communication paths: (1) a lower path for receiving signals $R_{in}$ generated at the far end of the network and (2) an upper path for communicating signals $S_{out}$ to the far end. The far end may be implemented in a manner similar to that of near end 100, rotated by 180 degrees such that the far end receives signals via its upper path and communicates signals via its lower path.

Received signals $R_{in}$ are routed to communications device 104 via hybrid 106, which may be implemented as a two-wire-to-four-wire converter that separates the upper and lower communication paths. Communications device 104 may be implemented as a land-line telephone, cell phone, or any other suitable communications device. Signals $S_{gen}$ generated at communications device 104 are routed through hybrid 106 to echo canceller 102 (discussed below), which processes the signals and provides output signals $S_{out}$ to the far end.

In generating signals at near end 100, unwanted echo may be introduced that diminishes the quality of the signals communicated to the far end. Generally, there are two types of echo that may be introduced: acoustic echo and hybrid echo (a.k.a., circuit echo or electric echo). Acoustic echo may be introduced when the loudspeaker of communications device 104 generates audio corresponding to signals $R_{in}$ received from the far end and the audio is picked up by the microphone of the device. Hybrid echo may be introduced when there is an impedance mismatch in the hybrid that allows a portion of received signals $R_{in}$ to be reflected back to the far end via the upper path.

The amount of echo in relation to received signal $R_{in}$ may be described in terms of an echo return loss (ERL). For example, between hybrid 106 and echo canceller 102, the ERL may be quantified as the ratio of (1) the energy $|R_{in}|^2$ of the far-end signal $R_{in}$ to (2) the energy of the far-end signal $R_{in}$ that is present in the near-end signal (i.e., the energy of the corresponding echo) as shown in Equation (1):

$$ERL_i = \frac{|R_{in,i}|^2}{|echo_i|^2} \quad (1)$$

where subscript i denotes the $i^{th}$ iteration. In practice, the ERL may change during communications due to echo path changes (EPCs) that may result from, for example, changes in line impedance or signal routing. When an EPC occurs, the ratio of the energy $|R_{in}|^2$ of the far-end signal $R_{in}$ to the energy of the echo (i.e., the ERL) may change. On the other hand, when an EPC is not occurring, the ERL typically remains relatively constant. In this situation, as the energy $|R_{in}|^2$ of the far-end signal $R_{in}$ increases, the energy of the echo increases proportionately, and when the energy $|R_{in}|^2$ of the far-end signal $R_{in}$ decreases, the energy of the echo decreases proportionately.

When a call is initiated or when an EPC occurs, echo canceller 102 adapts to the new echo path so that it may effectively remove the new echo from input signal $S_{in}$. Adaptation is performed using an update loop comprising combiner 108, adaptive filter 110, and controller 112. Combiner 108 receives (1) an estimate of the echo from adaptive filter 110 and (2) input signal $S_{in}$ from hybrid 106, and removes the estimated echo from input signal $S_{in}$ to obtain output signal $S_{out}$. Controller 112 receives signals $R_{in}$, $S_{in}$, and $S_{out}$, and generates an estimate of the residual echo contained within $S_{out}$. Based on this residual echo estimate, controller 112 updates filter coefficients using an adaptive algorithm, such as a normalized-least-mean-squares (NLMS) algorithm. Adaptive filter 110 applies the updated filter coefficients to received signal $R_{in}$ and outputs an updated estimate of the echo to combiner 108. This process is repeated, and, for each iteration, controller 112 attempts to step towards filter coefficients that, when applied to received signal $R_{in}$ by adaptive filter 110, produce an echo estimate that results in output signal $S_{out}$ having a residual echo of approximately zero. When the residual echo becomes approximately zero, echo canceller 102 has converged on an estimated echo that reflects the actual echo contained within input signal $S_{in}$.

The ability of echo canceller 102 to converge on the actual echo may be affected by the presence of signals $S_{gen}$ generated at communication device 104. A condition known as "double talk" (DT) occurs when both the near-end user and the far-end user are talking simultaneously so that input signal $S_{in}$ includes signals corresponding to both the near-end user of device 104 (e.g., $S_{gen}$) and the far-end user (e.g., echo). In such a situation, combiner 108 outputs signal $S_{out}$, which comprises generated signal $S_{gen}$ and residual echo. Controller 112 might have difficulty in differentiating between generated signal $S_{gen}$ and the residual echo, thereby making it relatively difficult for echo canceller 102 to converge on the actual echo. In some instances, the presence of double talk might be counterproductive and might actually cause echo canceller 102 to diverge from the actual echo. Thus, when double talk is present, it may be desirable to inhibit adaptation of echo canceller 102 to prevent divergence.

Various control algorithms may be implemented by controller 112 that (1) improve the ability of echo canceller 102 to converge on the actual echo and (2) prevent echo canceller 102 from diverging. One such control algorithm may adjust the size of the steps taken toward the estimated echo during adaptation. For example, during initial convergence, the control algorithm may direct controller 112 to use a larger step size in updating the filter coefficients for more aggressive initial convergence. As convergence nears, the control algorithm may direct controller 112 to use a smaller step size in updating the filter coefficients to reduce any possible steady-state error.

Another such control algorithm may be employed to detect EPCs that occur after echo canceller 102 converges on the actual echo. When an EPC has been detected, the control algorithm may direct controller 112 to restart adaptation from a more aggressive mode to achieve relatively quick re-convergence.

Yet another such control algorithm may be employed to detect the presence of DT and to inhibit adaptation when DT occurs in order to prevent divergence. Once DT disappears, adaptation may be resumed. One implementation of a DT detection (DTD) algorithm, known as the Geigel algorithm, is discussed in Duttweiler, "A Twelve-Channel Digital Echo Canceler," IEEE Transactions on Communications, Vol. Com-26, No. 5, May 1978, pp. 647-653, the teachings of which are incorporated herein by reference. Another implementation of a DTD algorithm, which uses cross-correlation, is discussed in Benetsy et al., "A New Class of Doubletalk Detectors Based on Cross-correlation," IEEE Transactions on Speech and Audio Processing, Vol. 8, No. 2, March 2000, pp. 168-172, the teachings of which are incorporated herein by reference. Yet another implementation of a DTD algorithm, which uses parallel adaptive filtering, is discussed in Liu, "A Novel Adaptation Scheme in the NLMS Algorithm for Echo Cancellation," IEEE Signal Processing Letters, Vol. 8, No. 1, January 2001, pp. 20-22, the teachings of which are incorporated herein by reference.

SUMMARY OF THE INVENTION

In one embodiment, the present invention is a method for detecting double talk (DT) in a telecommunications network. The method generates (i) a measure of average energy of a near-end signal in the telecommunications network and (ii) a measure of average energy of a far-end signal in the telecommunications network. A DT decision statistic is generated based on both the near-end and far-end average energy measures, and a DT decision is generated as to whether or not double talk is present in the telecommunications network based on the DT decision statistic.

In another embodiment, the present invention is a method for determining whether or not to inhibit updating of a set of filter coefficients for telecommunications network that filters a far-end signal, based on the set of filter coefficients, to generate an estimate of echo in a near-end signal. The method generates a DT decision as to whether or not DT is present in the telecommunications network. If the DT decision indicates that DT is present, then a counter is set to a specified hangover value. If the DT decision indicates that DT is not present, then the counter is adjusted. The counter is then compared to a specified counter threshold, and a determination is made whether or not to inhibit updating of the set of filter coefficients based on the comparison.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Overview of One Embodiment of a Double-Talk Detector of the Present Invention

Figure 1:
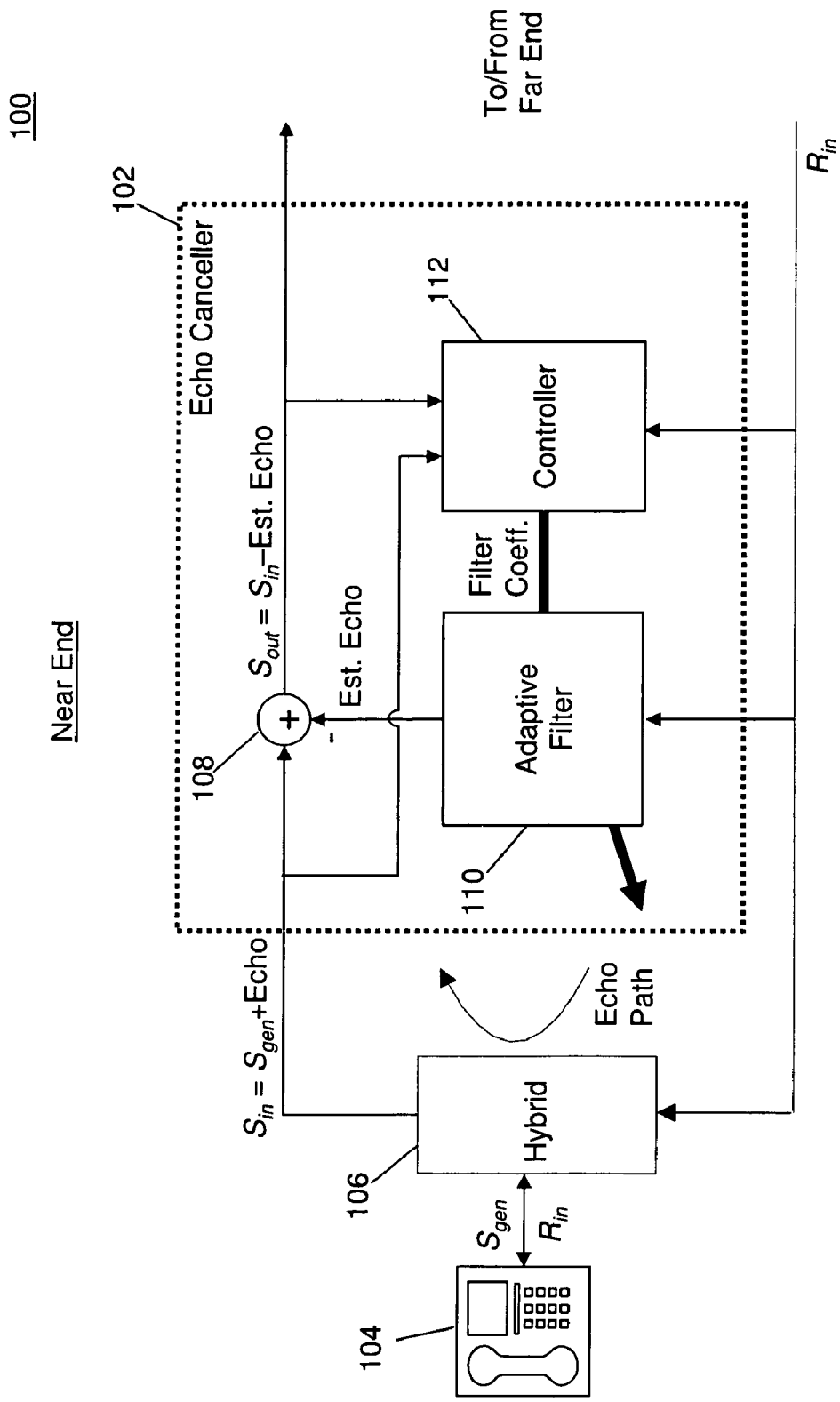
FIG. 1 shows a simplified block diagram of a near end of a prior-art telecommunications network.
Figure 2:
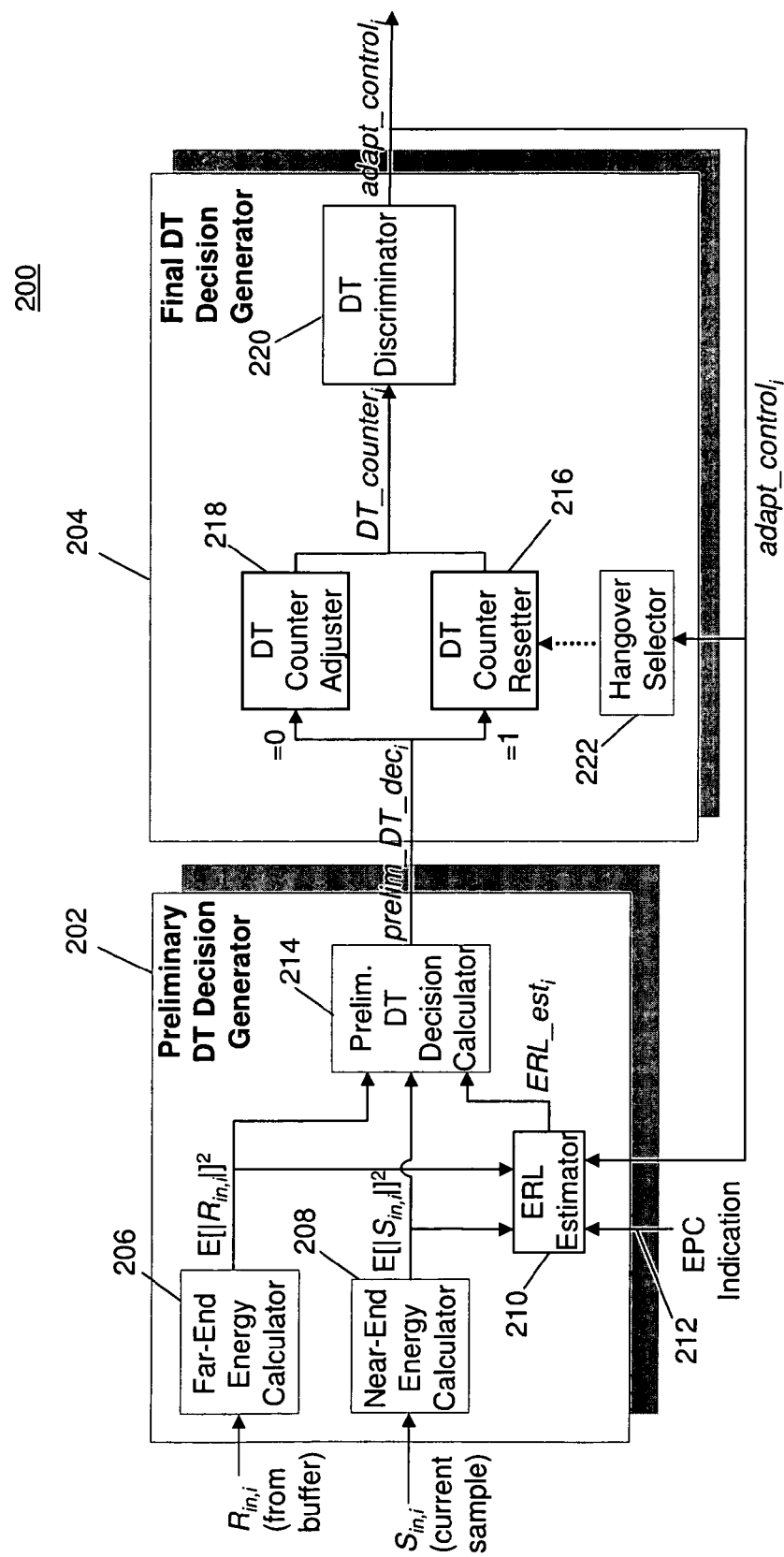
FIG. 2 shows a simplified block diagram of a double-talk (DT) detector according to one embodiment of the present invention.

FIG. 2 shows a simplified block diagram of a double-talk (DT) detector 200 according to one embodiment of the present invention. DT detector 200 can be implemented in a controller analogous to controller 112 of echo canceller 102 of FIG. 1 to detect the presence of DT in a telecommunications network. DT detector 200 receives (1) input signal $S_{in}$ generated at the near end of the telecommunications network and (2) signal $R_{in}$ received from the far end, and outputs an adaptation control signal (e.g., adapt_control$_i$). When DT detector 200 detects DT, it asserts the adaptation control signal to inhibit adaptation of the echo canceller. As discussed in the background, inhibiting adaptation of an echo canceller when DT is present may prevent the echo canceller from generating echo estimates that diverge from the actual echo.

DT detector 200 has preliminary DT decision generator 202, which generates preliminary decisions (e.g., prelim_DT_dec) as to whether DT is present, based on received signal $R_{in}$ and input signal $S_{in}$. These preliminary decisions could be used to inhibit adaptation of an echo canceller; however, some of the preliminary decisions could falsely identify the presence or absence of DT. If a preliminary decision falsely indicates that DT is present and adaptation of the echo canceller is inhibited, then the echo canceller is unnecessarily delayed from generating echo estimates that converge on the actual echo. If a preliminary decision falsely indicates that no DT is present and the echo canceller performs adaptation, then the echo canceller might generate echo estimates that diverge from the actual echo.

To reduce the possibility of diverging from the actual echo due to preliminary decisions that falsely indicate that no DT is present, DT detector 200 employs final DT decision generator 204 to generate more reliable final decisions as to whether DT is present. In particular, when a preliminary decision indicates that DT is present, final DT decision generator 204 generates a final decision indicating that DT is present. Once a preliminary decision indicates that DT is present, a specified number of preliminary decisions indicating that DT is not present must be continuously received before final DT decision generator 204 generates a final decision indicating that DT is not present. When a final decision indicates that DT is present, final DT decision generator 204 asserts the adaptation control signal to inhibit adaptation of the echo canceller. When a final decision indicates that no DT is present, final DT decision generator 204 de-asserts the adaptation control signal to resume adaptation of the echo canceller.

Preliminary DT Decision Generator

Preliminary DT decision generator 202 generates preliminary decisions by first generating (1) average energy values $E[|R_{in,i}|^2]$ for samples of far-end signal $R_{in}$ received from a buffer (discussed below) using far-end energy calculator 206 and (2) average energy values $E[|S_{in,i}|^2]$ for samples of input signal $S_{in}$ generated at the near end using near-end energy calculator 208. Each new averaged far-end energy value $E[|R_{in,i}|^2]$ and each new averaged near-end energy value $E[|S_{in,i}|^2]$ may be calculated using expected value (e.g., weighted moving average) methods as shown in Equations (2) and (3), respectively:

$$E[|R_{in,i}|^2] = \alpha E[|R_{in,i-1}|^2] + (1-\alpha)|R_{in,i}|^2 \quad (2)$$

$$E[|S_{in,i}|^2] = \alpha E[|S_{in,i-1}|^2] + (1-\alpha)|S_{in,i}|^2 \quad (3)$$

where $\alpha$ is a weighting constant between 0 and 1, $E[|R_{in,i-1}|^2]$ is the averaged far-end energy value for the previous iteration, $E[|S_{in,i-1}|^2]$ is the averaged near-end energy value for the previous iteration, $|R_{in,i}|^2$ is the instantaneous energy value for a possibly delayed sample of far-end signal $R_{in}$, and $|S_{in,i}|^2$ is the instantaneous energy value for the current sample of near-end signal $S_{in}$.

These energy calculations are used by echo return loss (ERL) estimator 210 to generate an estimate of the ERL (see Equation (1) discussed in the background) just prior to the echo canceller. Since the actual echo is not known, ERL estimator 210 calculates each new ERL estimate ($ERL\_est_i$) using input signal energy $|S_{in,i}|^2$ in place of the echo energy as shown in Equation (4) below:

$$ERL\_est_i = \beta \times ERL\_est_{i-1} + (1-\beta)\frac{E[|R_{in,i}|^2]}{E[|S_{in,i}|^2]} \quad (4)$$

where $\beta$ is a weighting constant between 0 and 1, $ERL\_est_{i-1}$ is the previous ERL estimate, $E[|R_{in,i}|^2]$ and $E[|S_{in,i}|^2]$ are the averaged far-end and near-end energy values of Equations (2) and (3), and $E[|R_{in,i}|^2]/E[|S_{in,i}|^2]$ is an instantaneous ERL estimate for corresponding samples of far-end signal $R_{in}$ and near-end signal $S_{in}$. Each ERL estimate is an averaged estimate, calculated using expected value (e.g., weighted moving average) methods to prevent inaccurate estimations that might otherwise result from relatively unstable energy calculations.

Using the input signal energy $|S_{in,i}|^2$ in place of the energy of the actual echo may result in ERL estimations that don't accurately reflect the actual ERL when DT is present. In particular, as discussed in the background, when DT occurs, near-end signal $S_{in}$ may comprise signal $S_{gen}$, generated at a communications device such as communications device 104 of FIG. 1, in addition to the echo. The addition of generated signal $S_{gen}$ generally increases input signal energies $|S_{in,i}|^2$ resulting in decreased, inaccurate ERL estimates (assuming that the ratio of received signal $R_{in}$ to echo is constant). Since DT may result in inaccurate ERL estimates, it may be desirable to inhibit the ERL estimation and to use the prior ERL estimate when it is suspected that DT is present. This may be accomplished by comparing instantaneous ERL estimates to a lower boundary (e.g., low_bound) as shown in Equation (5) below:

$$low\_bound \leq \frac{E[|R_{in,i}|^2]}{E[|S_{in,i}|^2]} \leq up\_bound \quad (5)$$

The lower boundary may be selected based on the worst-case ERL value for a particular network (e.g., 6 dB). Note that, above this worst-case ERL value, it is uncertain whether DT is present or whether the actual ERL is just low. If an instantaneous ERL estimate decreases below this worst-case ERL value, then it is possible that DT may be present.

Further, it may be desirable to inhibit the ERL estimation and to use the prior ERL estimate when the instantaneous ERL estimate is above a maximum possible ERL value for the network (e.g., 16 dB). An instantaneous ERL estimate that is above the maximum possible ERL may be indicative of an inaccurate calculation caused, for example, by the fixed-point division operations. In such a situation, it may be preferable to not update the ERL estimation using the inaccurate instantaneous ERL estimate. In determining whether to inhibit the ERL estimation, instantaneous ERL estimates may be compared to an upper boundary (e.g., up_bound) as shown in Equation (5), where the upper boundary may be selected based on the maximum possible ERL value.

Figure 3:
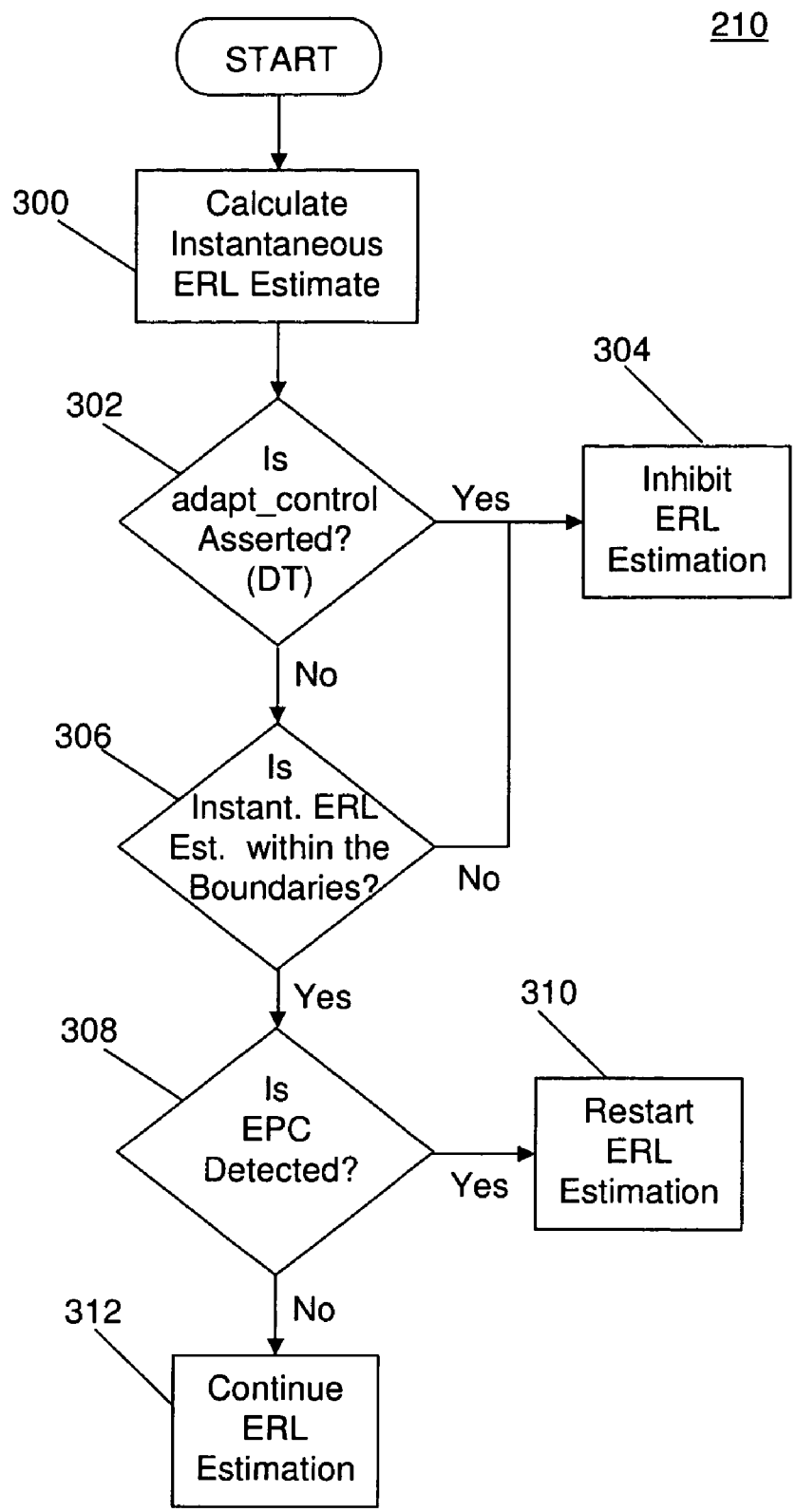
FIG. 3 is a simplified flow diagram of an ERL estimator of the DT detector of FIG. 2 according to one embodiment of the present invention.

FIG. 3 is a simplified flow diagram of ERL estimator 210 of DT detector 200 of FIG. 2 according to one embodiment of the present invention. For each iteration, ERL estimator 210 calculates an instantaneous ERL estimate (action 300) that may be used to generate an ERL estimate as shown in Equation (4). As shown in FIG. 2, ERL estimator 210 receives adaptation control signal $adapt\_control_i$ from final DT decision generator 204. If $adapt\_control_i$ is asserted, indicating that DT was detected (decision 302), then the ERL estimation for the current iteration is inhibited (action 304) and the ERL estimate $ERL\_est_{i-1}$ from the previous iteration is provided to preliminary DT decision calculator 214. However, if $adapt\_control_i$ is de-asserted, indicating that DT was not detected (decision 302), then ERL estimator 210 compares the instantaneous ERL estimate to the upper and lower boundaries as shown in Equation (5). If the instantaneous ERL estimate is not within the boundaries (decision 306), then the ERL estimation for the current iteration is inhibited (action 304).

If the instantaneous ERL estimate is within the boundaries (decision 306), then ERL estimator 210 verifies whether an echo path change (EPC) has been detected (decision 308). As shown in FIG. 2, ERL estimator 210 may receive an indication 212 as to whether or not an echo path change (EPC) has been detected. This indication 212 may be received from, for example, an EPC detection algorithm. If ERL estimator 210 receives an indication that an EPC was detected (decision 308), then ERL estimator 210 may restart the ERL estimation using a default ERL value (e.g., 6 dB) (action 310). If ERL estimator 210 receives an indication that an EPC was not detected (decision 308), then ERL estimator 210 may continue the ERL estimation using the instantaneous ERL estimate from this iteration and the ERL estimate $ERL\_est_{i-1}$ from the previous iteration (action 312).

Alternative embodiments of an ERL estimator may be envisioned by those with ordinary skill in the art without departing from the scope of this invention. Some of these alternative embodiments may be envisioned by rearranging the decisions and actions of ERL estimator 210. For example, according to various alternative embodiments, the instantaneous ERL estimates (e.g., action 300) may be calculated after the ERL estimator determines whether DT is present (e.g., action 302). Thus, if $adapt\_control_i$ is asserted, indicating the DT was detected, then the instantaneous ERL estimate would not be calculated. Further, according to some of these alternative embodiments, the frequency of certain calculations may be reduced. For example, according to various embodiments, the ERL estimator may inhibit the ERL estimation when the estimation is relatively stable. Determinations as to whether the ERL estimation is relatively stable may be made, for example, by (i) counting the number of ERL estimations that remain relatively constant over a specified period of time and (ii) comparing the number of counted estimations to a threshold value. If the ERL estimations are inhibited because they are relatively stable, then the ERL estimations may be restarted after an EPC has been detected.

Referring back to FIG. 2, the inhibited or updated ERL estimates are provided by ERL estimator 210 to preliminary DT decision calculator 214. Preliminary DT decision calculator 214 calculates a decision statistic (e.g., DT_dec_stat$_i$) as shown in Equation (6) and applies the decision statistic to Equation (7) to obtain a preliminary DT decision (e.g., prelim_DT_dec$_i$).

$$\text{DT\_dec\_stat}_i = \frac{E[|R_{in,i}|^2]}{E[|S_{in,i}|^2] \times \text{ERL\_est}_i} \quad (6)$$

$$\text{prelim\_DT\_dec}_i = \begin{cases} 1(DT), & \text{DT\_dec\_stat}_i \leq \text{threshold} \\ 0(No\ DT), & \text{DT\_dec\_stat}_i > \text{threshold} \end{cases} \quad (7)$$

As shown, when DT_dec_stat$_i$ is less than or equal to a specified threshold value, prelim_DT_dec$_i$ is asserted (i.e., selected to be 1), indicating that DT is present, and when decision statistic DT_dec_stat$_i$ is greater than the specified threshold value, prelim_DT_dec$_i$ is de-asserted (i.e., selected to be 0), indicating that DT is not present.

The specified threshold may be selected by considering the effects of DT on the value of DT_dec_stat$_i$. For example, when no DT is present and assuming the ERL estimate is accurate, DT_dec_stat$_i$ should be a value close to 1. However, when DT is present, input signal S$_{in}$ should be larger than it would be if DT were not present. This larger value of S$_{in}$ produces a DT_dec_stat$_i$ value that is smaller than 1. If the amount of DT is relatively large, then the value of DT_dec_stat$_i$ will typically be substantially smaller than 1, while if the amount of DT is relatively small, then the value of DT_dec_stat$_i$ will typically be less than but relatively close to 1. Note that values of DT_dec_stat$_i$ that are less than but relatively close to 1 may also occur as a result of factors other than relatively small amounts of DT, such as instability in the energy calculations, clipping of large signals, and inaccurate echo path delay estimations (described below). Thus, when the specified threshold value is relatively large (i.e., relatively close to 1), preliminary DT decision calculator 214 might be capable of detecting lower levels of DT; however, preliminary DT decision calculator 214 might also be susceptible to false determinations of DT when DT is not present. In selecting the specified threshold value used by preliminary DT decision calculator 214, a designer should balance the need to detect relatively low amounts of DT against the effects of false determinations of DT.

Referring back to FIG. 2, the accuracy of the preliminary decisions (and the ERL estimation) may be degraded if the echo path delay between far-end signal R$_{in}$ and near-end signal S$_{in}$ is not compensated. Echo path delay is the delay between (1) a sample of near-end signal S$_{in}$ that contains echo and (2) a sample of far-end signal R$_{in}$ that corresponds to the echo in the sample of near-end signal S$_{in}$. Compensation for the echo path delay may be performed by retrieving samples of received signal R$_{in}$ from a buffer. In particular, when an estimate of the echo path delay from the echo canceller is available and stable, the delay estimate may be used to locate the sample of far-end signal R$_{in}$ contained in the buffer that corresponds to the echo contained within the current sample of near-end signal S$_{in}$. Using corresponding samples of far-end signal R$_{in}$ and near-end signal S$_{in}$ may improve the accuracy of both the preliminary decisions and the ERL estimates.

Final DT Decision Generator

Final DT decision generator 204 receives the preliminary decisions prelim_DT_dec$_i$ from preliminary DT decision calculator 214 and generates final decisions as to whether DT is present using a counter (DT_counter$_i$). If a final decision is made that DT is present, then final DT decision generator 204 asserts adaptation control signal adapt_control, and if a final decision is made that DT is not present, then final DT decision generator 204 de-asserts adaptation control signal adapt_control.

Initially, the counter (DT_counter$_i$) is set to 0. As shown in Equation (8), when preliminary decision prelim_DT_dec$_i$ is asserted (i.e., equals 1) indicating DT was detected, DT counter resetter 216 sets DT_counter$_i$ to a specified hangover time (the selection of which is discussed below), and when preliminary decision prelim_DT_dec$_i$ is de-asserted (i.e., equals 0) indicating DT was not detected, DT counter adjuster 218 reduces DT_counter$_i$ by 1 (unless DT_counter$_i$ is already equal to 0).

$$\text{DT\_counter}_i = \begin{cases} \text{hangovertime}, & \text{prelim\_DT\_dec}_i = 1 \\ \max(0, \text{DT\_counter}_{i-1} - 1), & \text{prelim\_DT\_dec}_i = 0 \end{cases} \quad (8)$$

DT discriminator 220 receives DT_counter$_i$ values from the counter and makes determinations as to whether DT is present. As shown in Equation (9), if the value of DT_counter$_i$ is greater than 0, then DT discriminator 220 asserts adaptation control signal adapt_control$_i$ (i.e., sets adapt_control$_i$=1), indicating that DT is present. If the value of DT_counter$_i$ is equal to 0, then DT discriminator 220 de-asserts adaptation control signal adapt_control$_i$ (i.e., sets adapt_control$_i$=0), indicating that DT is not present.

$$\text{adapt\_control}_i = \begin{cases} 1(DT), & \text{DT\_counter}_i > 0 \\ 0(DT), & \text{DT\_counter}_i = 0 \end{cases} \quad (9)$$

When adapt_control$_i$ is asserted indicating that DT is present, adaptation of the echo canceller may be inhibited. When adapt_control$_i$ indicates that no DT is present, adaptation of the echo canceller may (1) be continued if adaptation had not been previously inhibited or (2) be resumed if adaptation had been previously inhibited.

Once preliminary decision prelim_DT_dec$_i$ is asserted (i.e., equal to 1) indicating that DT is present, the hangover time must expire before the echo canceller resumes adaptation. Requiring a hangover time to expire may reduce the possibility of erroneously switching from a final DT decision to a final non-DT decision when DT is actually present. This in turn reduces the chance that adaptation of the echo canceller will be resumed when DT is actually present.

The hangover time used by final DT decision generator 204 may be selected by considering the effects of longer or shorter hangover times on the operation of DT detector 200. On one hand, if final DT decision generator 204 generates a correct final decision that DT is present, then a longer hangover time may be preferable to a shorter hangover time. If a shorter hangover time were used in this situation, then adaptation of the echo canceller could be resumed before DT ceases. On the other hand, if final DT decision generator 204 generates an erroneous final decision that DT is present, then a shorter hangover time may be preferable to a longer hangover time. If a longer hangover time were used in this situation, then adaptation of the echo canceller could be unnecessarily delayed. In selecting a hangover time, a designer should balance the effects of longer and shorter hangover times.

Alternatively, to minimize adverse effects of longer and shorter hangover times, final DT decision generator 204 may be implemented using both longer and shorter hangover times that are dynamically selected based on, for example, the detection of DT for a continuous period. If adapt_control indicates that DT is present for a continuous period, then it is more likely that final DT decision generator 204 is correctly identifying that DT is present.

Figure 4:
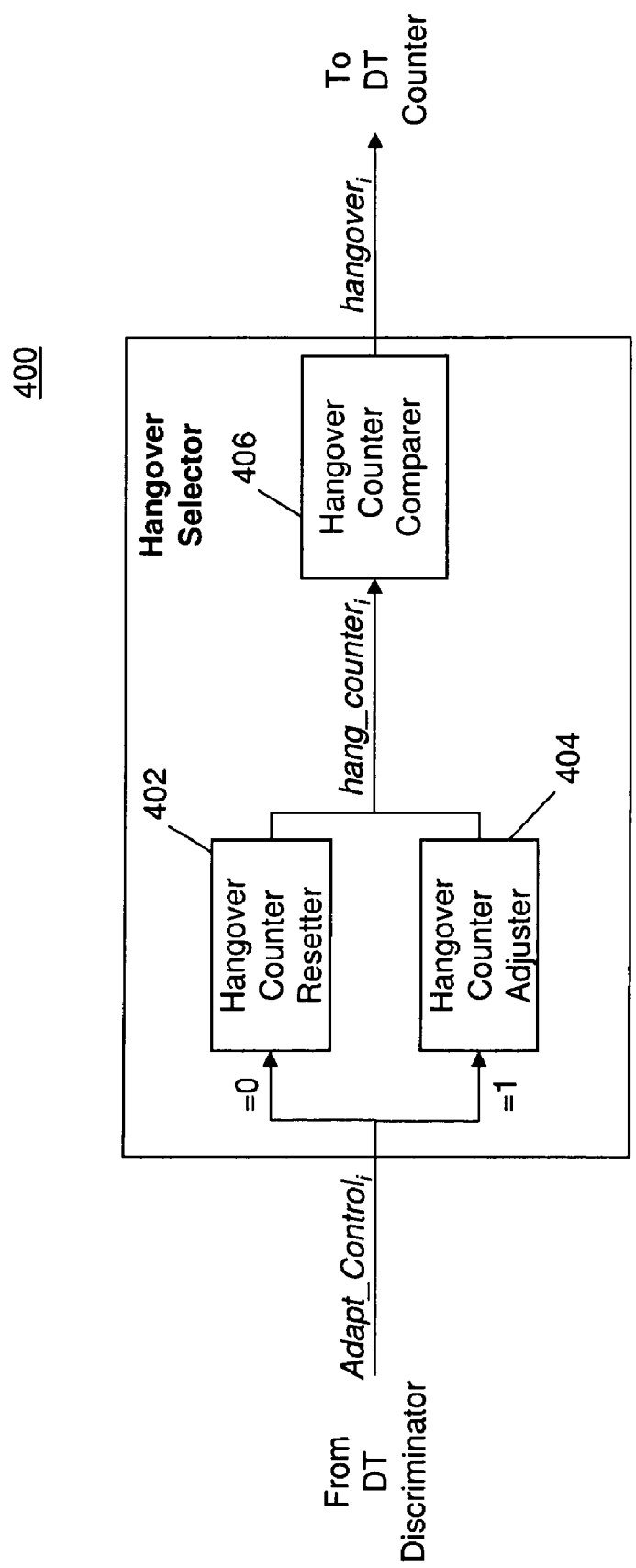
FIG. 4 shows a simplified block diagram of a hangover selector that may be used to implement the hangover selector of the DT detector of FIG. 2 according to one embodiment of the present invention.

FIG. 4 shows a simplified block diagram of a hangover selector 400 that may be used to implement hangover selector 222 of DT detector 200 according to one embodiment of the present invention. Hangover selector 400 receives adaptation control signal adapt_control$_i$ from DT discriminator 220 and selects a longer or shorter hangover time using a counter (hang_counter$_i$). If DT is detected for a continuous period, then the longer hangover time is selected. If DT is not detected for a continuous period, then the shorter hangover time is selected.

Initially, the counter is set to zero. As shown in Equation (10), hangover counter adjuster 404 resets counter hang_counter$_i$ to 0 each time adapt_control$_i$ is de-asserted (i.e., 0) indicating that DT is not detected. Each time adapt_control$_i$ is asserted (i.e., 1) indicating that DT is detected, hangover counter resetter 402 increases counter hang_counter$_i$ by 1.

$$\text{hang\_counter}_i = \begin{cases} 0, & \text{adapt\_control}_i = 0 \\ \text{hang\_counter}_{i-1} + 1, & \text{adapt\_control}_i = 1 \end{cases} \quad (10)$$

When the hang_counter$_i$ exceeds a specified threshold value (e.g., hang_counter_thresh), (i.e., when adapt_control$_i$ is asserted (i.e., 1) for a continuous period of time indicating that DT was detected for a continuous period) hangover counter comparer 406 selects longer hangover time hang_long as shown in Equation (11). When counter hang_counter$_i$ is below or equal to the specified threshold value indicating that DT was not detected for a continuous period, hangover counter comparer 406 selects shorter hangover time hang_short as shown in Equation (11).

$$hangover_i = \begin{cases} \text{hang\_long}, & \text{hang\_counter}_i > \text{hang\_counter\_thresh} \\ \text{hang\_short}, & \text{hang\_counter}_i \leq \text{hang\_counter\_thresh} \end{cases} \quad (11)$$

According to various embodiments of the present invention, certain calculations discussed above may be performed at lower (i.e., decimated) rates to reduce the computational load and/or improve the performance of DT detector 200. For example, according to various embodiments, final DT decision generator 204 may operate at a full rate of 8 KHz, while the ERL estimation of Equation (4) is performed at a reduced rate of 4 KHz (when not inhibited) and the preliminary decision calculation of Equation (7) is performed at 1 KHz. In addition, as described above, the ERL estimation may be inhibited when the estimation becomes stable. The reduced ERL estimation and preliminary decision calculation rates reduce the computational load of DT detector 200. Further, the reduced ERL estimation rate increases the sensitivity of the decision statistic calculation of Equation (6) to energy increases of input signal $S_{in}$, thereby improving the ability of preliminary DT decision generator 202 to detect the presence of DT. Simulations of DT detector 200 have shown that performing various calculations at lower rates does not sacrifice the ability of DT detector 200 to accurately detect occurrences of DT.

FIGS. 5A-D graphically illustrate exemplary results of a simulation performed for an echo canceller that implements a DT detector of the present invention. The simulation was performed over a 40-second time period. Further, the simulation was performed using an embodiment of a DT detector that was implemented using the parameters listed in TABLE I.

TABLE I

SIMULATION PARAMETERS

| Parameter | Value |
|---|---|
| prelim__DT__dec calculation frequency (Equation (7)) | 1 kHz |
| ERL estimation frequency (Equation (4)) | 4 kHz (when not inhibited) |
| $R_{in}$ and $S_{in}$ Energy Calculations | 8 kHz |
| low__bound value (Equation (5)) | 6 dB |
| up__bound value (Equation (5)) | 16 dB |
| threshold (Equation (7)) | 0.75 |
| hang__counter__thresh value (Equation (11)) | 1600 samples |
| hang__long value (Equation (11)) | 1000 samples |
| hang__short value (Equation (11)) | 10 samples |

Figures 5A, 5B, 5C, 5D:
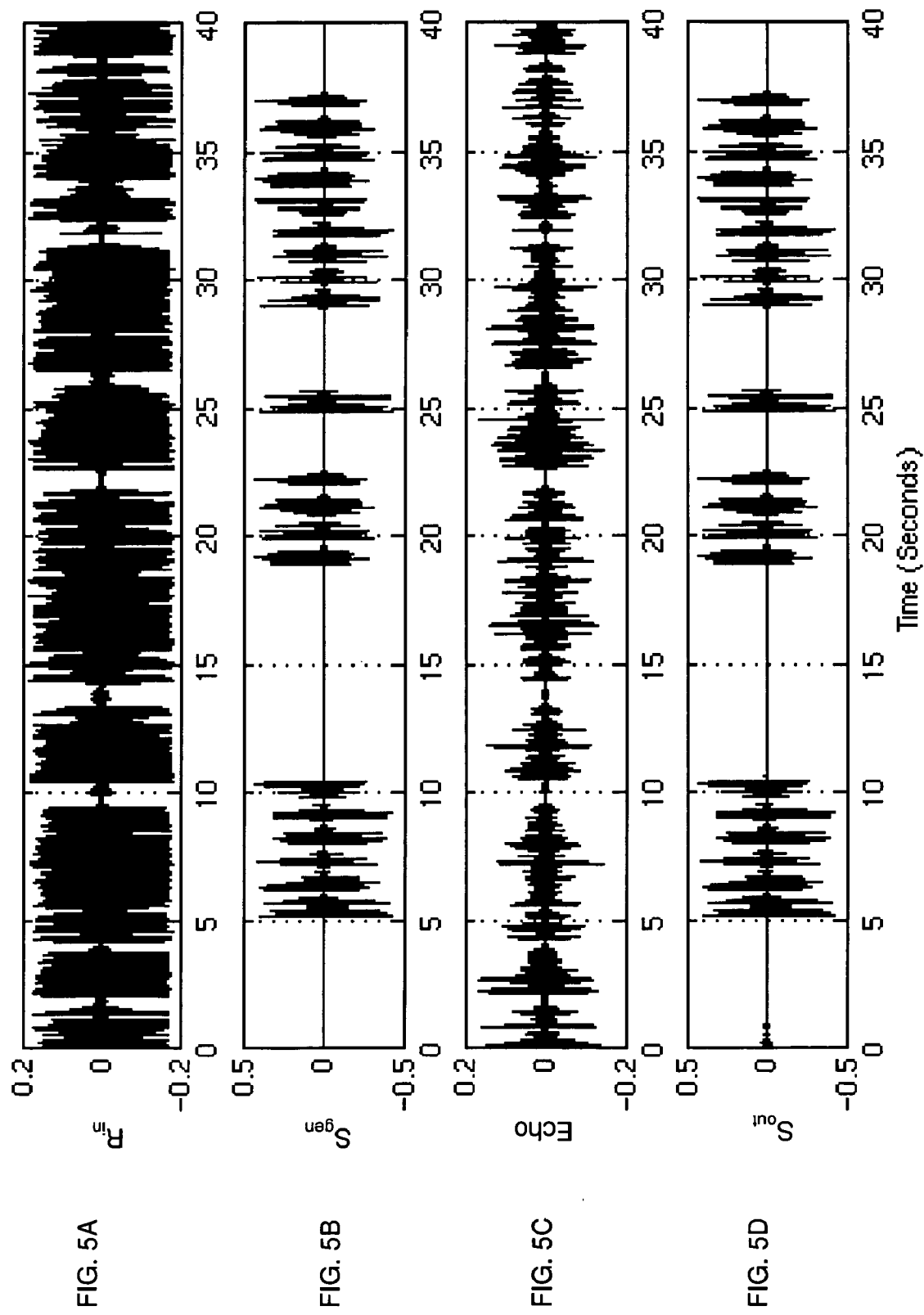
FIGS. 5A-D graphically illustrate exemplary results of a simulation performed for an echo canceller that implements a DT detector of the present invention.

FIG. 5A shows a far-end signal $R_{in}$ that was introduced into the simulation, and FIG. 5C shows the echo resulting from far-end signal $R_{in}$. At the approximate time periods of 5-11 s, 18-23 s, 25-26 s, and 29-37 s, signals $S_{gen}$ were generated as shown in FIG. 5B to introduce DT. The echo canceller generated an echo estimate and removed the estimate to produce output signal $S_{out}$ shown in FIG. 5D. As illustrated in FIG. 5D, the echo canceller, with the use of a DT detector of the present invention, was relatively effective at removing echo during periods in which DT was present and during periods in which DT was not present. Further, as illustrated in FIG. 5D, relatively effective echo cancellation resulted while using reduced rates for the preliminary decision calculations and the ERL estimations.

Compared to the Geigel algorithm, DT detector 200 may be more robust against near-end noise interference. The Geigel algorithm is based on a comparison of instantaneous signal magnitudes between the far end and near end, making the algorithm sensitive to near-end noise interference. When a relatively large magnitude of near-end noise is present, the accuracy of the DT detection by the Geigel algorithm may be adversely affected. DT detector 200, on the other hand, is implemented using a comparison of average signal energies between the far-end and near-end, making the algorithm more robust against near-end noise interference. Compared to the correlation-based algorithm and the parallel adaptive filtering algorithm, DT detector 200 may have lower computational complexity when the calculations of DT detector 200 are performed at a rate lower than the full rate as discussed above.

It will be further understood that various changes in the details, materials, and arrangements of the parts which have been described and illustrated in order to explain the nature of this invention may be made by those skilled in the art without departing from the scope of the invention as expressed in the following claims. For example, alternative embodiments of the present invention may use a DT counter that counts up to a hangover time rather than down. Similarly, alternative embodiments may use a hangover counter that counts down rather than up. Further, rates other than those described above may be used to perform the various calculations of the DT detector of the present invention. These rates may vary based on the particular application.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A method for detecting double talk in a telecommunications network, the method comprising:
   (a) generating a measure of average energy of a near-end signal in the telecommunications network;
   (b) generating a measure of average energy of a far-end signal in the telecommunications network;
   (c) generating a double-talk (DT) decision statistic based on the near-end average energy measure and the far-end average energy measure, wherein step (c) comprises:
   (c1) generating an estimate of echo return loss (ERL) based on the near-end average energy measure and the far-end average energy measure; and
   (c2) generating the DT decision statistic based on ERL estimate, the near-end average energy measure, and the far-end average energy measure;
   (d) generating a DT decision as to whether or not double talk is present in the telecommunications network based on the DT decision statistic, wherein the telecommunications network filters the far-end signal based on a set of filter coefficients to generate an estimate of echo in the near-end signal; and
   (e) determining whether or not to inhibit updating the set of filter coefficients based on the DT decision, wherein step (e) comprises:
   (e1) setting a counter to a specified hangover value if the DT decision indicates that double talk is present;
   (e2) adjusting the counter if the DT decision indicates that double talk is not present;
   (e3) comparing the counter to a specified counter threshold; and
   (e4) determining whether or not to inhibit the updating of the set of filter coefficients based on the comparison of step (e3).

2. The invention of claim 1, wherein step (e1) comprises dynamically selecting the specified hangover value based on duration of current inhibition of the updating of the set of filter coefficients.

3. The invention of claim 2, wherein:
   the specified hangover value is set to a relatively long hangover value if the duration of the current inhibition is greater than a specified duration threshold; and
   the specified hangover value is set to a relatively short hangover value if the duration of the current inhibition is less than the specified duration threshold.

4. An apparatus for detecting double talk in a telecommunications network, the apparatus comprising:
   means for generating a measure of average energy of a near-end signal in the telecommunications network;
   means for generating a measure of average energy of a far-end signal in the telecommunications network;
   means for generating a double-talk (DT) decision statistic based on the near-end average energy measure and the far-end average energy measure, wherein the means for generating the DT decision statistic comprises:
      means for generating an estimate of echo return loss (ERL) based on the near-end average energy measure and the far-end average energy measure; and
      means for generating the DT decision statistic based on ERL estimate, the near-end average energy measure, and the far-end average energy measure;
   means for generating a DT decision as to whether or not double talk is present in the telecommunications network based on the DT decision statistic, wherein the telecommunications network filters the far-end signal based on a set of filter coefficients to generate an estimate of echo in the near-end signal; and
   means for determining whether or not to inhibit updating the set of filter coefficients based on the DT decision, wherein the means for determining whether or not to inhibit updating the set of filter coefficients comprises:
      means for setting a counter to a specified hangover value if the DT decision indicates that double talk is present;
      means for adjusting the counter if the DT decision indicates that double talk is not present;
      means for comparing the counter to a specified counter threshold; and means for determining whether or not to inhibit the updating of the set of filter coefficients based on comparisons of the counter to the specified counter threshold.

5. In a telecommunications network that filters a far-end signal, based on a set of filter coefficients, to generate an estimate of echo in a near-end signal, a method for determining whether or not to inhibit updating the set of filter coefficients, the method comprising:
   (a) generating a double talk (DT) decision as to whether or not double talk is present in the telecommunications network;
   (b) setting a counter to a specified hangover value if the DT decision indicates that double talk is present, wherein the specified hangover value is dynamically selected based on duration of current inhibition of the updating of the set of filter coefficients;
   (c) adjusting the counter if the DT decision indicates that double talk is not present;
   (d) comparing the counter to a specified counter threshold; and
   (e) determining whether or not to inhibit the updating of the set of filter coefficients based on the comparison of step (d).

6. The invention of claim 5, wherein:
   the specified hangover value is set to a relatively long hangover value if the duration of the current inhibition is greater than a specified duration threshold; and
   the specified hangover value is set to a relatively short hangover value if the duration of the current inhibition is less than the specified duration threshold.

7. An apparatus for determining whether or not to inhibit updating a set of filter coefficients for a telecommunications network that filters a far-end signal, based on the set of filter coefficients, to generate an estimate of echo in a near-end signal, the apparatus comprising:
   a preliminary double talk (DT) decision generator adapted to generate a DT decision as to whether or not double talk is present in the telecommunications network;
   a hangover selector adapted to set a counter to a specified hangover value if the DT decision indicates that double talk is present, wherein the hangover selector is adapted to dynamically select the specified hangover value based on duration of current inhibition of the updating of the set of filter coefficients;
   a DT counter adjuster adapted to adjust the counter if the DT decision indicates that double talk is not present; and
   a DT discriminator adapted to (1) compare the counter to a specified threshold and (2) determine whether or not to inhibit the updating of the set of filter coefficients based on comparisons of the counter to the specified counter threshold.

8. The invention of claim 7, wherein:
   the specified hangover value is set to a relatively long hangover value if the duration of the current inhibition is greater than a specified duration threshold; and
   the specified hangover value is set to a relatively short hangover value if the duration of the current inhibition is less than the specified duration threshold.

* * * * *